(12) United States Patent
Anttila et al.

(10) Patent No.: US 9,167,414 B2
(45) Date of Patent: Oct. 20, 2015

(54) MANAGEMENT OF SUBSCRIBER DATA IN MOBILE SYSTEM

(75) Inventors: Ilkka Anttila, Helsinki (FI); Toivo Kihlanki, Helsinki (FI); Ilpo Paltemaa, Espoo (FI)

(73) Assignee: Vringo Infrastructure Inc., New York, NY (US)

( * ) Notice: Subject to any disclaimer, the term of this patent is extended or adjusted under 35 U.S.C. 154(b) by 0 days.

(21) Appl. No.: 13/618,628

(22) Filed: Sep. 14, 2012

(65) Prior Publication Data

US 2013/0035096 A1 Feb. 7, 2013

Related U.S. Application Data

(63) Continuation of application No. 10/297,333, filed as application No. PCT/FI01/00527 on Jun. 4, 2001.

(30) Foreign Application Priority Data

Jun. 5, 2000 (FI) ..................................... 20001339

(51) Int. Cl.
*G06F 15/173* (2006.01)
*H04W 8/12* (2009.01)
*H04M 3/42* (2006.01)
*H04L 29/08* (2006.01)
(Continued)

(52) U.S. Cl.
CPC ................. *H04W 8/12* (2013.01); *H04L 67/04* (2013.01); *H04L 67/18* (2013.01); *H04L 67/306* (2013.01); *H04L 69/329* (2013.01); *H04M 3/42* (2013.01); *H04M 3/42229* (2013.01); *H04W 4/08* (2013.01); *H04W 8/04* (2013.01); *H04W 8/06* (2013.01)

(58) Field of Classification Search
USPC .......................................................... 709/223
See application file for complete search history.

(56) References Cited

U.S. PATENT DOCUMENTS 5,802,320 A * 9/1998 Baehr et al. .................... 709/249
5,826,014 A * 10/1998 Coley et al. ..................... 726/12
(Continued)

FOREIGN PATENT DOCUMENTS

EP 1009175 6/2000
GB 2331817 6/1999
(Continued)

OTHER PUBLICATIONS

Transmissions Control Protocol: RFC 793 Sep. 1981 pp. 9-10.
(Continued)

*Primary Examiner* — Richard G Keehn
(74) *Attorney, Agent, or Firm* — Cozen O'Connor

(57) ABSTRACT

The present invention relates to a mobile system comprising a mobile network having a mobile services switching center (MSC, MSCA) for switching connections in the mobile network, and at least one subscriber database server (CSE) for maintaining data on the subscribers of the mobile network. The mobile services switching center (MSC, MSCA) comprises means for querying for and receiving subscriber data from the subscriber database server (CSE) wherein subscriber data are maintained in www page format, and the subscriber database server (CSE) comprises at least one www page for each subscriber in the mobile network, in which page the subscriber's subscriber data are stored, the search address of the www page being created based on the subscriber's identity.

16 Claims, 3 Drawing Sheets

(51) Int. Cl.
*H04W 4/08* (2009.01)
*H04W 8/04* (2009.01)
*H04W 8/06* (2009.01)

(56) References Cited

U.S. PATENT DOCUMENTS

| | | | |
|---|---|---|---|
| 5,878,231 A * | 3/1999 | Baehr et al. | 709/245 |
| 5,999,973 A | 12/1999 | Glitho et al. | |
| 6,061,798 A * | 5/2000 | Coley et al. | 726/12 |
| 6,091,808 A | 7/2000 | Wood et al. | |
| 6,097,793 A | 8/2000 | Jandel | |
| 6,133,912 A | 10/2000 | Montero | |
| 6,141,545 A | 10/2000 | Begeja et al. | |
| 6,148,342 A * | 11/2000 | Ho | 709/225 |
| 6,222,536 B1 * | 4/2001 | Kihl et al. | 709/203 |
| 6,240,447 B1 | 5/2001 | Banga et al. | |
| 6,243,443 B1 * | 6/2001 | Low et al. | 379/88.17 |
| 6,253,234 B1 | 6/2001 | Hunt et al. | |
| 6,292,838 B1 * | 9/2001 | Nelson | 709/236 |
| 6,456,852 B2 | 9/2002 | Bar | |
| 6,473,097 B1 | 10/2002 | Elliot | |
| 6,473,502 B1 * | 10/2002 | Karau et al. | 379/221.13 |
| 6,502,106 B1 | 12/2002 | Gampper et al. | |
| 6,516,328 B1 * | 2/2003 | Mori et al. | 715/229 |
| 6,522,342 B1 * | 2/2003 | Gagnon et al. | 715/716 |
| 6,546,005 B1 | 4/2003 | Berkley et al. | |
| 6,578,113 B2 | 6/2003 | Krishnamurthy et al. | |
| 6,600,918 B1 | 7/2003 | Youngs et al. | |
| 6,615,267 B1 | 9/2003 | Whalen et al. | |
| 6,622,016 B1 * | 9/2003 | Sladek et al. | 455/414.1 |
| 6,701,309 B1 * | 3/2004 | Beeferman et al. | 1/1 |
| 6,714,641 B2 | 3/2004 | Kredo et al. | |
| 6,788,769 B1 | 9/2004 | Waites | |
| 6,798,771 B1 * | 9/2004 | Low et al. | 370/353 |
| 6,870,921 B1 | 3/2005 | Elsey et al. | |
| 6,996,072 B1 | 2/2006 | Minborg | |
| 2002/0002569 A1 | 1/2002 | Nguyen et al. | |
| 2003/0061272 A1 | 3/2003 | Krishnamurthy et al. | |

FOREIGN PATENT DOCUMENTS

| | | |
|---|---|---|
| WO | WO 98/44747 | 10/1998 |
| WO | WO 99/07106 | 2/1999 |
| WO | WO 00/62565 | 10/2000 |

OTHER PUBLICATIONS

Gralla, Preston; "How the Internet Works" © 1999; Que Publishing.
Patent Abstract of Japan, Publication No. 11-355442, published Dec. 24, 1999.

* cited by examiner

MANAGEMENT OF SUBSCRIBER DATA IN MOBILE SYSTEM

RELATED APPLICATIONS

This application is a continuation of U.S. patent application Ser. No. 10/297,333 which was filed with the U.S. Patent and Trademark Office on Apr. 4, 2003 which is a national stage of PCT/FI01/00527, filed Jun. 4, 2001. Priority is claimed for this invention and application, corresponding applications having been filed in Finland on Jun. 5, 2000, No. 20001339,respectively.

BACKGROUND OF THE INVENTION

1 Field of the Invention

The present invention relates to mobile systems and particularly to the management of subscriber data therein.

2 SUMMARY OF THE INVENTION

A solution for maintaining subscriber data in a home location register (HLR) and in a visitor location register (VLR) is previously known in for example the GSM system (Global System for Mobile Communication). In this case, the home location register maintains subscriber data regarding all mobile subscribers in a network. The structure of a home location register is a computer and a data storage associated therewith. As a mobile subscriber moves in the mobile network, necessary subscriber data are copied from the home location register to the visitor location register within whose area the mobile subscriber is located at each particular time. At the same time, information on the visitor location register in whose area the mobile subscriber is located is stored in the home location register. A visitor location register may be located in association with a mobile services switching centre, in which case the area of the visitor register may be the area covered by said mobile services switching centre.

In the above solution, problems are caused by increasing amounts of data in mobile networks and the associated need for a higher processing capacity, and the difficulty of adding supplementary functions. Increasing numbers of subscribers in mobile networks and services that are more versatile are causes of increased amounts of data. Typical functions requiring much capacity include transfer of service profiles associated with subscriber management and monitoring, and maintenance and transfer of location data. The present system, which is based on mobile services switching centre technology, is mainly intended for use with telephone technology, and does not possess the required processing capacity. When a new type of service is added to the present system, the centre always has to adapt a new program. A mobile services switching centre is not either an efficient means for browsing through data.

The object of the invention is to solve the above problems by providing a solution allowing simpler management of large amounts of subscriber data in a mobile system. This object is achieved with a mobile system comprising a mobile network having a mobile services switching centre for switching connections in the mobile network, and at least one subscriber database server for maintaining data on the subscribers of the mobile network. This mobile system is characterized in that the mobile services switching centre comprises means for querying for and receiving subscriber data from the subscriber database server wherein subscriber data are maintained in www (World Wide Web) page format, and the subscriber database server comprises at least one www page for each subscriber in the mobile network, in which page the subscriber's subscriber data are stored, the search address of the www page being created based on the subscriber's identity.

The invention also relates to a mobile services switching centre for switching connections in a mobile network. The mobile services switching centre is characterized in that the mobile services switching centre comprises means for querying for and receiving subscriber data from a subscriber database server wherein subscriber data are maintained in www page format.

The invention further relates to a subscriber data main server for maintaining subscriber data in a mobile network. The main server is characterized in that the main server comprises, for each subscriber in the mobile network, at least one www page wherein the subscriber's subscriber data are stored, the search address of the www page being created based on the subscriber's identity.

The invention still further relates to a subscriber data local server for temporary storage of subscriber data. The local server is characterized in that it comprises means for receiving queries for the subscriber data from a mobile services switching centre, means for retrieving the queried subscriber data from a database in the local server, means for retrieving the queried subscriber data further from a main server if said data are not found in the database of the local server, means for transferring the retrieved subscriber data to the mobile services switching centre, and means for storing the retrieved subscriber data in the local server in www page format.

The idea of the invention is to apply www, http (Hypertext Transfer Protocol), html (Hypertext Markup Language), IP (Internet Protocol) and other Internet technology in the subscriber databases instead of the present HLR/VLR technology. This means that the data of a mobile subscriber in a subscriber database server are used to create at least one www page from which a mobile switching centre queries for information required by different functions. For this reason, the mobile services switching centre has to be provided with an IP interface, via which call control and other programs requiring data are able to query for the information they require, i.e. www pages. The mobile services switching centre uses a www address as the search address, the address indicating the desired subscriber data page and being created based on the subscriber's identity and a control function. It may be said that the mobile services switching centre provides a path for data to be transferred, but the data associated with special services are processed and managed in the IP network. The use of an IP network having higher-capacity hardware facilitates data retrieval and management. As services become more versatile, necessary new functions are increasingly easier to incorporate into IP network servers with different programming tools.

In a first preferred embodiment of the mobile system of the invention, the system comprises a subscriber data main server wherein subscriber-specific www pages are stored, and at least one subscriber data local server between a mobile services switching centre and the main server for temporarily maintaining subscriber data. In this case, the local server is used for buffering subscriber data. Since not all queries have to be transferred all the way to the main server, but the data are found in the local server, access to data does not become unnecessarily slow even in a large network.

In a first preferred embodiment of the subscriber data main server of the invention, the main server comprises at least a subscriber-specific main page wherein the most generally needed subscriber data are stored and whereto said search address points, and at least one subpage wherein the subscriber data needed in special cases are stored and whose search address is created by completing the search address of said main page. This division also aims at faster data retrieval.

In a second preferred embodiment of the subscriber data main server of the invention, the main server comprises means for maintaining a www page specific log regarding subscriber data queries such that the log contains information on the local server that sent a query for a page and the time the query was sent. For example, when an operator or dispatcher changes the subscriber data, the changed data have to be transferred to the local servers that, based on a time stamp, have corresponding usable data. In this case, a check can be made in the log to find out the location of such no-good data and transfer an update there.

In a first preferred embodiment of the subscriber data local server of the invention, the local server comprises means for providing the new or changed subscriber data to be stored in the local server with a time stamp, means for checking the time stamp when the next query or notice of change regarding the same subscriber data is received, means for selecting the stored data if a predetermined term from the storage has not lapsed. This avoids unnecessary data searches. Once certain subscriber data have been queried for, the data may be stored in the local server, provided with a time stamp. If the same data are queried for again soon, the data do not have to be searched for again in the main server, but sufficiently recent stored data can be used directly. This requires that a term be set indicating how long the old data are usable.

The preferred embodiments of the mobile system, mobile services switching centre, main server and local server of the invention are disclosed in the attached dependent claims.

BRIEF DESCRIPTION OF THE DRAWINGS

In the drawings.

In the following, the invention will be described in detail by way of example with reference to the accompanying figures, in which.

The figures schematically show different data search and management cases. For example, they may describe the invention applied to the TETRA system (Terrestrial Trunked Radio) or some other mobile system.

DETAILED DESCRIPTION OF THE PRESENTLY PREFERRED EMBODIMENTS

Figure 1:
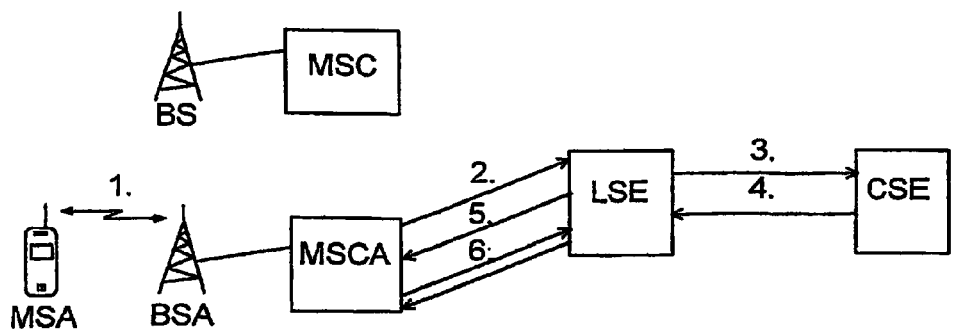
FIG. 1 is a block diagram of the system of the invention in a situation when a query is made for the subscriber data of subscriber A.

FIG. 1 is a block diagram of the system of the invention in a situation when a query is made for the subscriber data of subscriber A. The system shown comprises a mobile station MSA of subscriber A, base stations (BS) BSA, mobile services switching centres (MSC) MSCA, and a local server LSE and a main server CSE. In the figure, the numbers of the arrows indicate successive steps.

The main server CSE comprises a subscriber database. All changes in the data are primarily made therein. Depending on the size of the network, the number of subscribers and service types, there may be several main servers CSE, which divide the load so as to optimize the management of the number of subscribers, service types or other data. As FIG. 1 shows, besides a main server CSE, a large network comprises local servers LSE. The www pages generated from mobile subscriber data are retrieved from the subscriber database server according to the http standard. For example, the search address http://www.mobile-data.xxxnetwo-rk/subsdata/<subsid>, where <subsid> is the identifier of the desired subscriber, gains access to a page containing subscriber-specific data. This page may contain links to other pages that contain data needed in special cases and are accessed by merely completing the address. The address of a subpage containing subscriber data relating to special services is e.g. http://www.mobiledata.xxxnetwork/subsdata/<subsid>-/<addinfo>, where <subsid> is the identifier of the desired subscriber and <addinfo> the address of the desired special information. Since for example in the TETRA system, a subscriber may have several different identifier numbers and a text form identifier, the same subscriber data may have several different <subsid> addresses referring to it.

In step 1 in FIG. 1, subscriber A makes a call or registers via the base station BSA. In step 2, the MSCA queries for a www page including the subscriber's service data of the subscriber database server. This could be e.g. a 'services of subscriber A' www page. Since in this exemplary case, said information is not found in the local server LSE, the query is sent forward to the main server CSE in step 3. In step 4, the main server CSE returns the queried subscriber data to the local server LSE, which in step 5 sends the service data further to the querying MSCA. At the same time, the local server LSE stores the data in its files. In order to ensure that a www page contained by the local server LSE is up to date, it monitors the time stamp to find out when data was last received from the main server CSE. Out of date data are not used, but a new page is retrieved from the main server CSE. During the next call, i.e. step 6, the MSCA receives the data stored in association with the previous call directly from the local server LSE. This means that the data does not have to be queried for again from the main server CSE.

Figure 2:
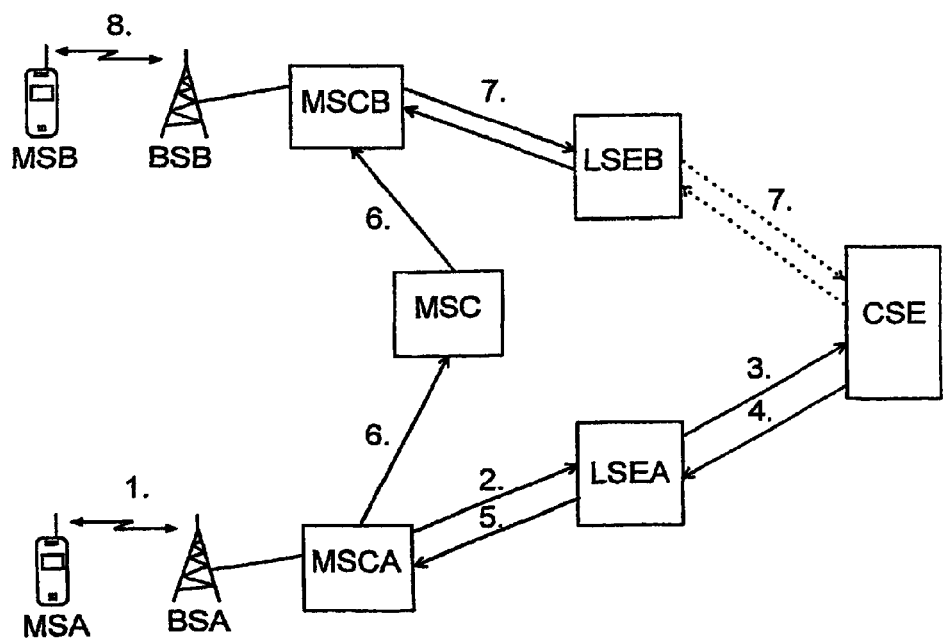
FIG. 2 is a block diagram of the system of the invention in a situation when a call is established between subscribers A and B.

FIG. 2 is a block diagram of the system of the invention in a situation when a call is established between subscribers A and B. The system shown comprises a mobile station MSA of subscriber A, a mobile station MSB of subscriber B, base stations BSA, BSB, mobile services switching centres MSCA, MSCB, local servers LSEA, LSEB, and a main server CSE. In step 1, subscriber A makes a call via the BSA. In step 2, the MSCA of subscriber A inquires about the location of the MSB of subscriber B from its local server LSEA. For example, a 'subscriber location' www-page could be involved. Since in this exemplary case the inquired subscriber data are not found in the LSEA, in step 3, an inquiry is made to the main server CSE. In step 4, the main server CSE returns the inquired data to the LSEA, which in step 5 sends the received data further to the MSCA. At the same time, the LSEA stores the data for future inquiries. In step 6, the call is routed via the network of MSCA and MSC to the MSCB of subscriber B. In step 7, the MSB of subscriber B queries its LSEB for the service data of subscriber B, e.g. from a 'called subscriber services' www page. If need be, the inquiry passes all the way to the CSE. If the data indicate that a call is allowed to subscriber B, the MSCB switches it to subscriber B in step 8.

Figure 3:
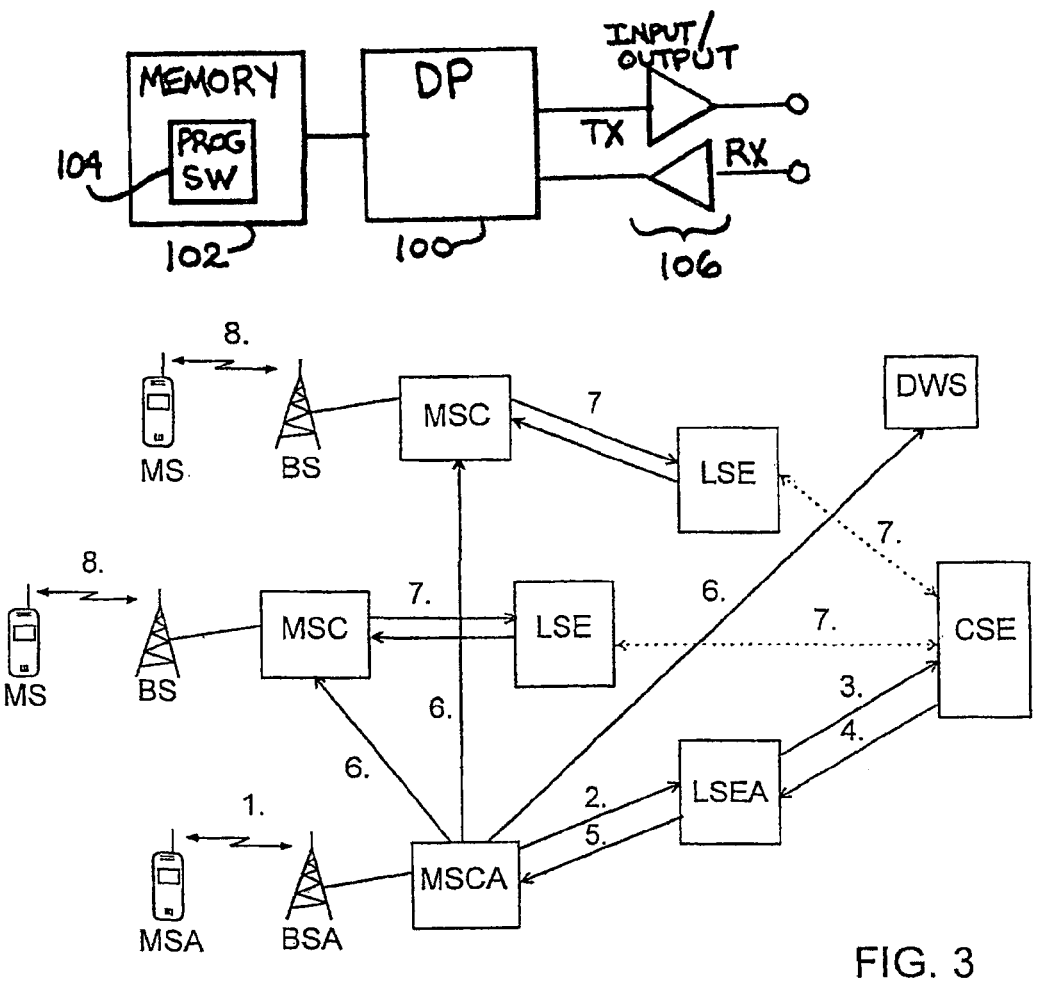
FIG. 3 is a block diagram of the system of the invention in a situation when a group call is established.

FIG. 3 is a block diagram of the system of the invention in a situation when a group call is established. The system shown comprises a mobile station MSA of subscriber A, other mobile stations MS, base stations BSA, BS, mobile services switching centres MSCA, MSC, local servers LSEA, LSE, a main server CSE, and a dispatcher workstation DWS. In step 1, subscriber A initiates a group call. In step 2, the MSCA inquires group data of its local server LSEA, e.g. from a 'group services' www page. Since in this exemplary case the group data are not found in the LSEA, in step 3, the LSEA makes an inquiry for the data further to the main server CSE. In step 4, the CSE returns the group data to the LSEA in the form of a www page, and, in step 5, the LSEA transfers the data to the MSCA. In step 6, the MSCA makes group call switchings to other mobile services switching centres MSC in the group's area and to the DWS. In step 7, the other mobile services switching centres MSC inquire group data of their local servers LSE. If need be, the inquiry for these data is made all the way to the CSE. In step 8, the mobile services switching centres make group call switchings to a radio network.

Figure 4:
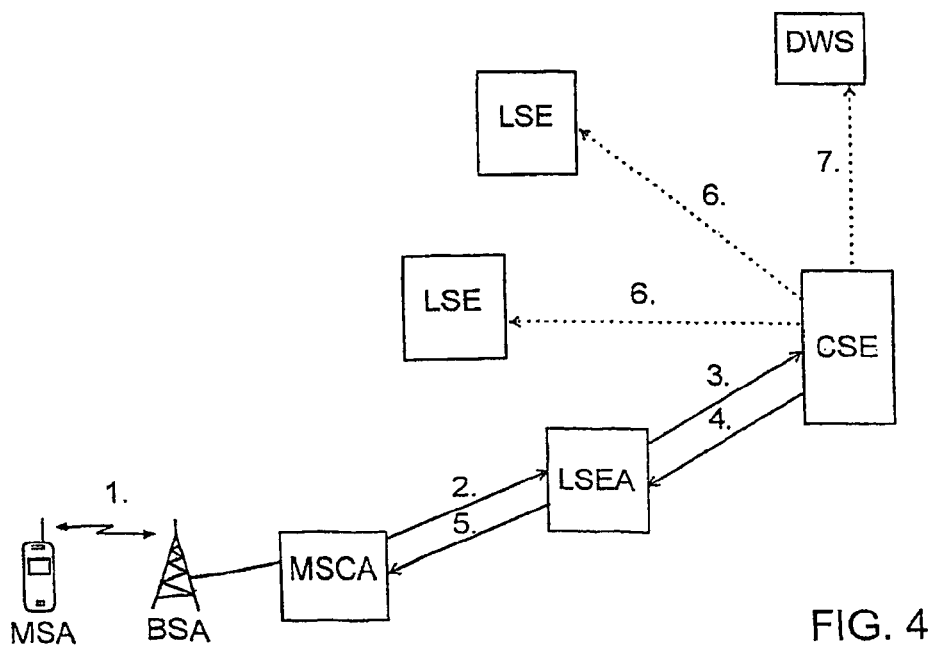
FIG. 4 is a block diagram of the system of the invention in a situation when subscriber location data are updated.

FIG. 4 is a block diagram of the system of the invention in a situation when subscriber location data are updated. The system shown comprises a mobile station MSA of subscriber A, a base station BSA, a mobile services switching centre MSC, local servers LSEA, LSE, a main server CSE and a dispatcher workstation DWS. In step 1, subscriber A changes his location. In step 2, the MSCA requests that the LSEA change the location data. In step 3, the LSEA relays the task to the CSE using e.g. a POST or PUT operation, which updates the data in e.g. a 'subscriber location' www page. In step 4, the CSE returns new location data to the LSEA in the form of a www page. In step 5, the LSEA acknowledges the change in the location data to the MSCA. In step 6, if need be, the CSE notifies also other local servers LSE of the change in the location of subscriber A in the form of a www page. In step 7, the CSE notifies the change in the location to other special servers, such as the DWS, in the form of a www page. Steps 6, 7 and 4 may occur simultaneously.

The situation of FIG. 4 is also applicable to updating group data. In this case, in step 1, subscriber A performs e.g. a group attach/detach measure, i.e. attaches to or detaches from a group. In step 2, the MSCA notifies the change to the LSE, which may be a separate local server for group data. In step 3, the LSE notifies the change in the group data further to the CSE. In principle, steps 4 to 7 are the same as in a location data update, i.e. comprise returning the new group data to the LSEA, transferring an acknowledgement to the MSCA and transferring the changed data to other local servers LSE and to special servers, such as the dispatcher workstation DWS.

Figure 5:
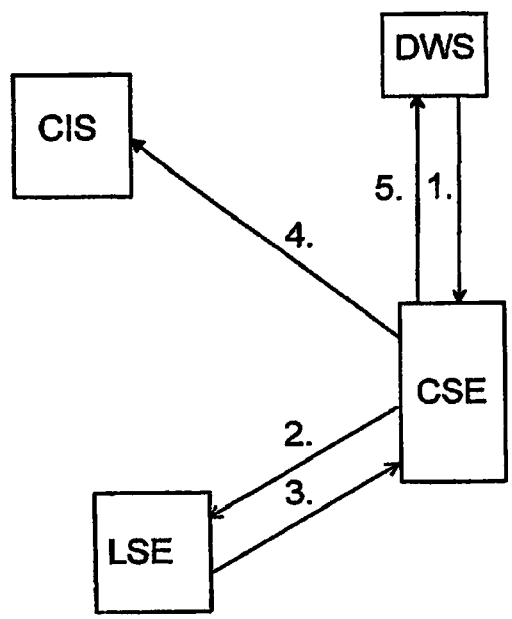
FIG. 5 is a block diagram of the system of the invention in a situation when a dispatcher updates group data.

FIG. 5 is a block diagram of the system of the invention in a situation when a dispatcher updates group Data. The system shown comprises a dispatcher workstation DWS, a local server LSE, a main server CSE and one special server CIS (Communications Interface Server). In step 1, using the DWS, the dispatcher changes the group data in the CSE using e.g. a POST or PUT operation e.g. to the www page of said services of the group. Since the LSE may have data that are usable according to the time stamp but in reality out of date, the changed data are to be relayed to the LSE. In step 2, the CSE notifies the change to one or more group data local servers LSE. To be able to send the changed data only to the LSE having the out of date data, the CSE keeps a page-specific log of the inquiring local servers LSE. The inquiring local servers LSE and the times the inquiries were made may be recorded in the log. The CSE is able to check the log for local servers from the latest inquirer to the earliest whose returned page is not yet out of date. The changed new page is sent only to such local servers LSE by using e.g. a PUSH operation, and information about the delivery of the changed page is recorded in the log. In step 3, the local servers LSE acknowledge the changes to the CSE. In step 4, the CSE notifies the change in its group data to those special servers CIS that need this information. If need be, the CSE may also notify the change to other dispatcher workstations. In step 5, the CSE acknowledges the change to the DWS.

Figure 6:
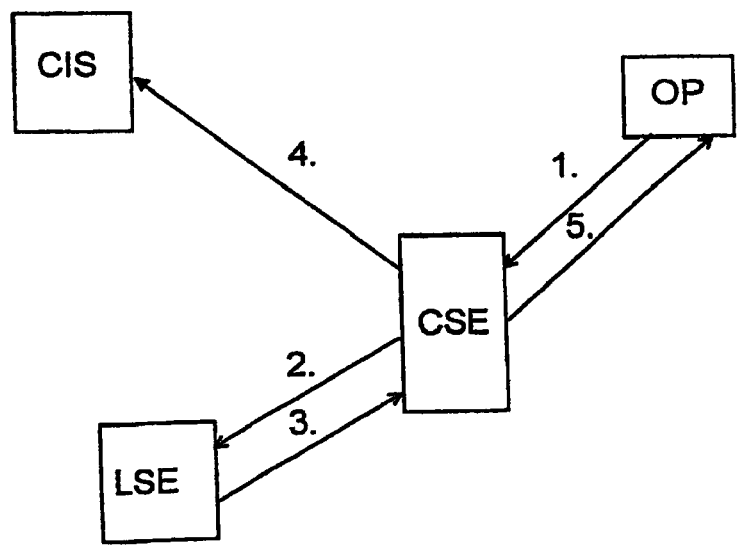
FIG. 6 is a block diagram of the system of the invention in a situation when an operator updates subscriber data.

FIG. 6 is a block diagram of the system of the invention in a situation when an operator updates subscriber data. The system shown comprises an operator OP, a local server LSE, a main server CSE and one special server CIS. In step 1, the OP changes a subscriber's group data in the CSE e.g. on the www page of said service of the subscriber. In step 2, the CSE notifies the change in the group data to the group data local servers LSE that need the information. In step 3, the local servers LSE acknowledge the changes to the CSE. In step 4, the CSE notifies the change to the special servers CIS that need said information. In step 5, the CSE acknowledges the change as made to the OP.

It is to be understood that the above specification and the related figures are only intended to illustrate the present invention. Different variations and modifications of the invention are apparent to those skilled in the art, without deviating from the scope and spirit of the invention disclosed in the attached claims.

What is claimed:

1. A mobile system comprising:
a mobile network having a mobile services switching center configured to switch connections in the mobile network, and
at least one subscriber database server configured to maintain data on the subscribers of the mobile network,
wherein the mobile services switching center configured to query and receive subscriber data from the subscriber database server,
wherein subscriber data is maintained in World Wide Web page format, the mobile service switching center using a world wide web address as a search address when querying for the subscriber data,
wherein the subscriber database server comprises at least one World Wide Web page for each subscriber in the mobile network, in which page the subscriber's subscriber data are stored, the search address of the World Wide Web page based at least in part on the subscriber's identity,
wherein the subscriber data comprises data used by the mobile services switching center for different mobile services switching center functions, including at least a mobile call control function,
wherein the subscriber database server is configured to maintain a World Wide Web page specific log regarding subscriber data queries such that the log indicates which local server sent a query for a page and the time the query was sent,
wherein the at least one World Wide Web page for each subscriber is updated by the subscriber database server based at least in part on data from the mobile services switching center.

2. The mobile system as claimed in claim 1, wherein the data comprises location data.

3. The mobile system as claimed in claim 1, wherein the mobile services switching center requests that the local server change a location data.

4. The mobile system as claimed in claim 1, wherein a local server task is configured to relay the request as a task to the subscriber database server as one of a POST operation and a PUT operation.

5. An apparatus comprising:
a processor; and
a memory including computer program code, where the memory and computer program code are configured to, with the processor, cause the apparatus at least to perform, maintaining subscriber data in a mobile network;
for each subscriber in the mobile network, at least one World Wide Web page wherein the subscriber's subscriber data is stored, said World Wide Web page having a search address based on the respective subscriber's identity;
sending a subscriber's subscriber data in response to a query from a mobile services switching center including a World Wide Web address as a search address,
wherein the query is initiated by the mobile services switching center and wherein subscriber data comprises data used by the mobile services switching center for different mobile services switching center functions, including a mobile network call control function;
a subscriber-specific main page wherein a first set of data of the subscriber data is stored and whereto said search address points; and
at least one subpage linked to the subscriber-specific main page, wherein a second set of data of the subscriber data is stored and whose search address is created by completing the search address of said main page, the at least one subpage comprising special cases data accessed by completing the World Wide Web address,
wherein the at least one World Wide Web page for each subscriber is updated by the subscriber database server based at least in part on data from the mobile services switching center.

6. An apparatus, comprising:
a processor; and
a memory including computer program code, where the memory and computer program code are configured to, with the processor, cause the apparatus at least to perform, maintaining subscriber data in a mobile network;
for each subscriber in the mobile network, at least one World Wide Web page wherein the subscriber's subscriber data is stored, said World Wide Web page having a search address based on the respective subscriber's identity; and
sending a subscriber's subscriber data in response to a query from a mobile services switching center including a World Wide Web address as a search address, wherein the query is initiated by the mobile services switching center and wherein subscriber data comprises data used by the mobile services switching center for different mobile services switching center functions, including a mobile network call control function,
wherein the apparatus is embodied as a main server and is configured to maintain a World Wide Web page specific log regarding subscriber data queries such that the log indicates which local server sent a query for a page and the time the query was sent,
wherein the at least one World Wide Web page for each subscriber is updated by the subscriber database server based at least in part on data from the mobile services switching center.

7. An apparatus, comprising:
a processor; and
a memory including computer program code, where the memory and computer program code are configured to, with the processor, cause the apparatus at least to perform, receiving queries for subscriber data from a mobile services switching center, said queries having a World Wide Web address as a search address;
retrieving the queried subscriber data from a database in the apparatus;
retrieving the queried subscriber data further from a main server when said queried subscriber data is not found in the database of the apparatus;
transferring the retrieved subscriber data to the mobile services switching center;
where said subscriber data is stored in the database as at least one World Wide Web page in World Wide Web page format, said World Wide Web page having a search address based on a respective subscriber's identity, wherein the queries are initiated by the mobile services switching center and wherein subscriber data comprises data used by the mobile services switching center for different mobile services switching center functions, including a mobile network call control function;
receiving information about a change in subscriber data caused by the subscriber from the mobile services switching center;
forwarding the information about said change in subscriber data to the main server;
receiving the changed subscriber data in the form of a World Wide Web page from the main server; and
forwarding an acknowledgement about the change in the subscriber data to the mobile services switching center.

8. The apparatus as claimed in claim 7, further comprising:
receiving subscriber data that is changed by an operator from the main server in World Wide Web page format; and
forwarding an acknowledgement of the reception of the changed subscriber data to the main server.

9. The apparatus as claimed in claim 7, further comprising:
providing the subscriber data to be stored in the apparatus with a time stamp;
checking the time stamp in association with the reception of a following query or notification of change relating to the same subscriber data; and
selecting the stored data conditionally based on whether a predetermined time has lapsed from storage of the stored data.

10. A method, comprising:
receiving queries for subscriber data for a particular subscriber from a mobile services switching center, said queries using a World Wide Web address as a search address;
retrieving the queried subscriber data from a database in a local server;
retrieving the queried subscriber data further from a main server when said data is not found in the database of the local server;
transferring the retrieved subscriber data to the mobile services switching center;
storing the retrieved subscriber data in the local server in World Wide Web page format, said World Wide Web page having a search address based on the identity of the particular subscriber,
wherein the queries are initiated by the mobile services switching center and wherein subscriber data comprises data used by the mobile services switching center for different mobile services switching center functions, including a mobile network call control function;

receiving information about a change in subscriber data caused by the subscriber from the mobile services switching center;

forwarding the information about said change in subscriber data to the main server;

receiving the changed subscriber data in the form of a World Wide Web page from the main server; and forwarding an acknowledgement about the change in the subscriber data to the mobile services switching center.

11. The method of claim 10, further comprising:

receiving subscriber data that is changed by an operator from the main server in World Wide Web page format; and forwarding an acknowledgement of the reception of the changed subscriber data to the main server.

12. The method of claim 10, further comprising:

providing the subscriber data to be stored in the local server with a time stamp; checking the time stamp in association with the reception of a following query or notification of change relating to the same subscriber data; and selecting the stored data conditionally based on whether a predetermined time has lapsed from storage of the stored data.

13. A method, comprising:

maintaining subscriber data in a mobile network;

storing, for each subscriber in the mobile network, at least one World Wide Web page wherein the subscriber's subscriber data is stored, said World Wide Web page having a search address based on the respective subscriber's identity;

sending a subscriber's subscriber data in response to a query from a mobile services switching center including a World Wide Web address as a search address, wherein the query is initiated by the mobile services switching center and wherein subscriber data comprises data used by the mobile services switching center for different mobile services switching center functions, including a mobile network call control function;

storing a subscriber-specific main page wherein a first set of data of the subscriber data is stored and whereto said search address points; and storing at least one subpage linked to the subscriber-specific main page, wherein a second set of data of the subscriber data is stored and whose search address is created by completing the search address of said main page, the at least one subpage comprising special cases data accessed by completing the World Wide Web address, wherein the at least one World Wide Web page for each subscriber is updated by the subscriber database server based at least in part on data from the mobile services switching center.

14. A method, comprising:

maintaining subscriber data in a mobile network;

storing, for each subscriber in the mobile network, at least one World Wide Web page wherein the subscriber's subscriber data is stored, said World Wide Web page having a search address based on the respective subscriber's identity;

sending a subscriber's subscriber data in response to a query from a mobile services switching center including a World Wide Web address as a search address, wherein the query is initiated by the mobile services switching center and wherein subscriber data comprises data used by the mobile services switching center for different mobile services switching center functions, including a mobile network call control function; and maintaining a World Wide Web page specific log regarding subscriber data queries such that the log indicates which local server sent a query for a page and the time the query was sent, wherein the at least one World Wide Web page for each subscriber is updated by the subscriber database server based at least in part on data from the mobile services switching center.

15. A computer-readable memory encoded with instructions that, when executed, cause a device to perform a process, the process comprising:

receiving queries for subscriber data for a particular subscriber from a mobile services switching center, said queries using a World Wide Web address as a search address;

retrieving the queried subscriber data from a database in a local server;

retrieving the queried subscriber data further from a main server when said data is not found in the database of the local server;

transferring the retrieved subscriber data to the mobile services switching center;

storing the retrieved subscriber data in the local server in World Wide Web page format, said World Wide Web page having a search address based on the identity of the particular subscriber, wherein the queries are initiated by the mobile services switching center and wherein subscriber data comprises data used by the mobile services switching center for different mobile services switching center functions, including a mobile network call control function;

receiving information about a change in subscriber data caused by the subscriber from the mobile services switching center;

forwarding the information about said change in subscriber data to the main server;

receiving the changed subscriber data in the form of a World Wide Web page from the main server; and forwarding an acknowledgement about the change in the subscriber data to the mobile services switching center.

16. A non-transitory computer-readable medium encoded with instructions that, when executed, cause a device to perform a process, the process comprising:

maintaining subscriber data in a mobile network;

storing, for each subscriber in the mobile network, at least one World Wide Web page wherein the subscriber's subscriber data is stored, said World Wide Web page having a search address based on the respective subscriber's identity;

sending a subscriber's subscriber data in response to a query from a mobile services switching center including a World Wide Web address as a search address, wherein the query is initiated by the mobile services switching center and wherein subscriber data comprises data used by the mobile services switching center for different mobile services switching center functions, including a mobile network call control function; and maintaining a World Wide Web page specific log regarding subscriber data queries such that the log indicates which local server sent a query for a page and the time the query was sent, wherein the at least one World Wide Web page for each subscriber is updated by the subscriber database server based at least in part on data from the mobile services switching center.

* * * * *